United States Patent [19]

Lumpp

[11] Patent Number: 4,596,935

[45] Date of Patent: Jun. 24, 1986

[54] DEVICE FOR THE PRODUCTION AND REFLECTION OF INFRARED OR ULTRAVIOLET RADIATION

[76] Inventor: Christian Lumpp, 16 rue de Presles, 88560 Saint Maurice sur Moselle, France

[21] Appl. No.: 601,646

[22] Filed: Apr. 18, 1984

[30] Foreign Application Priority Data

| | | | |
|---|---|---|---|
| Apr. 25, 1983 | [FR] | France | 83 07082 |
| Nov. 8, 1983 | [FR] | France | 83 18063 |
| Nov. 8, 1983 | [FR] | France | 83 18066 |

[51] Int. Cl.⁴ .......... G01J 1/00
[52] U.S. Cl. .......... 250/495.1; 250/504 R
[58] Field of Search .......... 250/493.1, 494.1, 495.1, 250/504 R; 350/614, 628; 126/439

[56] References Cited

U.S. PATENT DOCUMENTS

| | | | |
|---|---|---|---|
| 1,602,245 | 10/1926 | Nisbet | 250/504 R |
| 3,733,461 | 5/1973 | Rohats | 250/493.1 |
| 3,831,289 | 8/1974 | Knight | 250/504 |
| 4,162,824 | 7/1979 | Ma | 350/614 |

*Primary Examiner*—Bruce C. Anderson
*Attorney, Agent, or Firm*—Felfe & Lynch

[57] ABSTRACT

The invention relates to a panel for the production and directional reflection of infrared or ultraviolet radiation.

The quartz tubes (5) employed for emission of radiation are juxtaposed within a frame. The rear reflector is constituted by V-section elements (8) which are placed side by side in order to define reflecting troughs (19).

Application: construction of a self-supporting reflector which permits variation in power, outputs and wavelengths of the infrared-radiation emitted by the panel.

26 Claims, 19 Drawing Figures

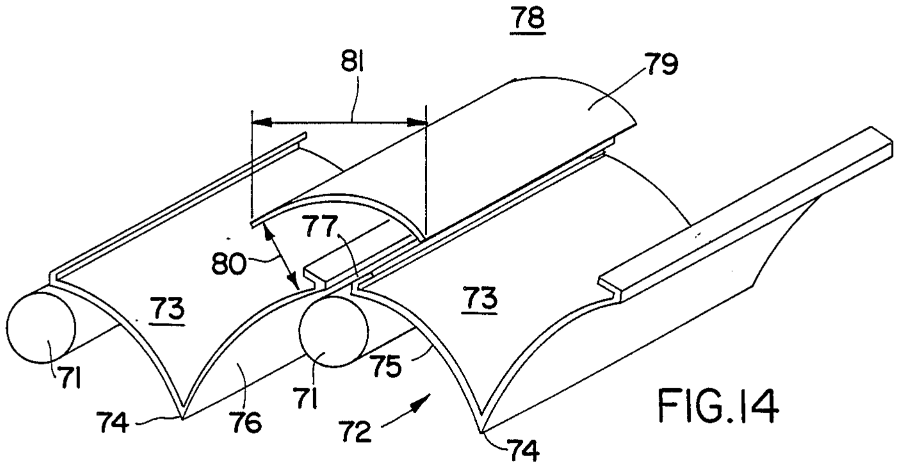
FIG.14
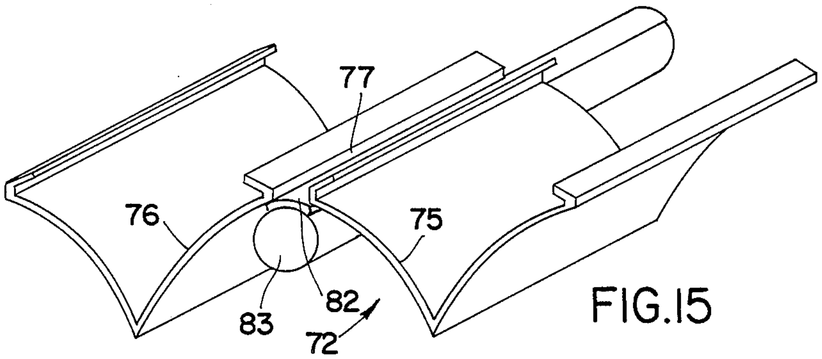
FIG.15
FIG.16
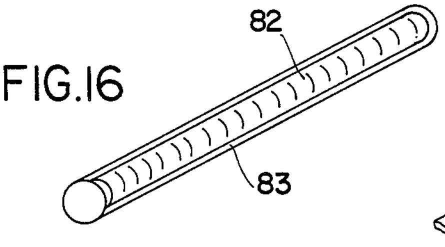
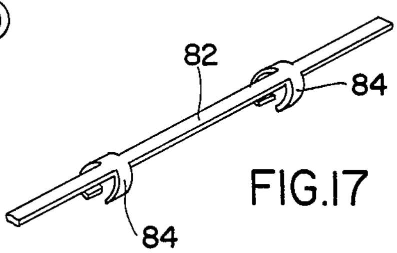
FIG.17

DEVICE FOR THE PRODUCTION AND REFLECTION OF INFRARED OR ULTRAVIOLET RADIATION

The present invention relates to a device for the production and diffusion by reflection of infrared or ultraviolet radiation.

Devices of this type are already known which are constructed in the form of panels and can be employed, for example, in the paper industry, the textile industry, the plastics industry, and so on. Infrared-radiation panels are also employed in tunnel furnaces for such purposes as baking of bread in industrial bakeries or paint-drying in the automobile industry.

In the majority of cases, infrared radiation is produced by rectilinear quartz tubes disposed at intervals and in parallel relation over the entire surface of the panel, the rear face of which is occupied by a reflector system designed to reflect all the emitted radiation toward the front. The structure of the panel and more particularly the construction of the reflector set a problem which is difficult to solve for the following essential reasons:

the reflector and its supporting members are subjected to high thermal stresses as a result of the high temperature of the quartz tubes located in the immediate vicinity;

these stresses vary with the radiant power of the quartz tubes;

it is difficult to construct a reflector which withstands these high and variable stresses while entirely occupying the large area of the panel.

In French Pat. No. 70 21350 has been proposed a lighting device including a grid for the distribution of light, comprising lengthwise reflection blades the upper part of which ending at the lamp side, as intermediary reflecting blades having nearly the shape of a V.

This device is related to lighting as such and does not concern infrared radiations. Furthermore, the opening angle corresponding to lost radiation is 110°, what represents 30% of the whole radiation and no ventilation is foreseen. Such a structure could not be used at temperatures of about 2700° K. that is to say the temperature of the devices according to the present invention.

In U.S. Pat. No. 3,654,471 has been described a reflector device for electromagnetic radiation from an elongated radiation source comprising a profiled holder formed as a body having a cavity that provides a supporting surface for a reflecting metal strip.

In such structures, a blade of air is formed between two reflecting devices and induces the creation of venturi phenomenon bringing corrosive vapors into contact with the lamp and the reflecting part of the device.

It is found in practice that the majority of known installations solve the problem incompletely. For example, it is known to construct a panel which is capable of diffusing only infrared radiation of constant wavelength. This is attended by a disadvantage in practice since it is known that the possibility of varying the wavelength during operation would be advantageous, all the more so as a short infrared quartz tube is much more costly than a long infrared tube.

The object of the present invention is to overcome these drawbacks by providing a device for the production and reflection of infrared radiation, in the form of a panel in which a plurality of radiation-emitting tubes are grouped together and in which reflecting means are located behind said tubes. The distinctive feature of the invention lies in the fact that the tubes are placed at an equal distance and parallel to each other within a rectangular frame while a reflector in the general form of a series of concave troughs is located behind the emitting tubes. Each trough is placed behind one tube and is defined by a juxtaposed assembly of two longitudinal elements each having a V-shaped cross-section with two externally concave arms. The connecting gap formed between two juxtaposed elements is masked by a longitudinal shield placed at this location behind the two elements, each of which is self-supporting.

In accordance with another distinctive feature of the invention, each longitudinal element having a concave V-section is constituted by a sheet metal member which is bent to said V-shaped cross-section. In consequence, said longitudinal element is not only self-supporting but is also capable of elastic deformation under the action of variable thermal stresses of the type encountered, for example, if the radiant power and therefore the wavelength of the emitted rays are varied during operation.

In order to improve the performances of this device, more particularly when the infrared-radiation has a high intensity, it is useful to forsee a reflector for infrared-radiation emitting tubes in accordance with the invention comprising a juxtaposed assembly of rear shields and or elements in the form of two half-troughs and distinguished by the fact that at least the elements in the form of two half-troughs are hollow, a coolant fluid being circulated within the internal space of said elements.

In accordance with another distinctive feature of the invention, the rear shields are also hollow and have a double wall, a coolant fluid being circulated within the internal space of said shields.

The coolant fluid which circulates within the double walls of the reflector may be, for example, blown air.

A number of different technological solutions may be proposed for constructing the double wall of the shields and of the V-section elements consisting of two half-troughs.

An improvement has also been foreseen in order to position more easily the protective shield at the level of each junction gap between each of the two half-troughs.

The shield device in accordance with the invention for providing a barrier to the radiation emitted by a tube in the direction of a gap defined in the reflector which is located behind said tube is distinguished by the fact that the shield is constituted by an opaque strip applied along part of the rear surface of the radiant tube.

In accordance with another distinctive feature of the invention, the metallic strip forming the shield is constituted by a metallization deposit formed directly on the wall of the tube, provision being accordingly made for an ordinary tube which is opacified only along a reflectorized strip of metal or of ceramic material.

In accordance with yet another distinctive feature of the invention, the shield is constituted by a concave sheet-metal strip mounted against a portion of the rear longitudinal wall of the tube. In other words, the width of said metallic strip in the form of a trough is distinctly smaller than the diameter of the tube. It should be clearly understood that the term "metal" is used in its broadest sense, that is to say without any limitation with regard to the nature of the metal employed.

In accordance with a further distinctive feature of the invention, the concave metal trough constituting the shield is fixed on the tube by snap-action engagement of a resilient fastening-clip, with the result that, when a tube is changed, the shield of the old tube can be used on the new tube.

Finally, according to a particular mode of realization of the invention each V-section element of the reflector is constituted at least at its reflecting surface by a layer of sheet of gold or other metals.

It must be said that for simplifications purposes, the invention herein described will only refer to devices for the production of infrared-radiations, but it will be understood that these devices may be used for any radiation and more particularly for ultra-violet radiation.

Other features of the invention will be more apparent upon consideration of the following description and accompanying drawings, wherein.

Figure 10:
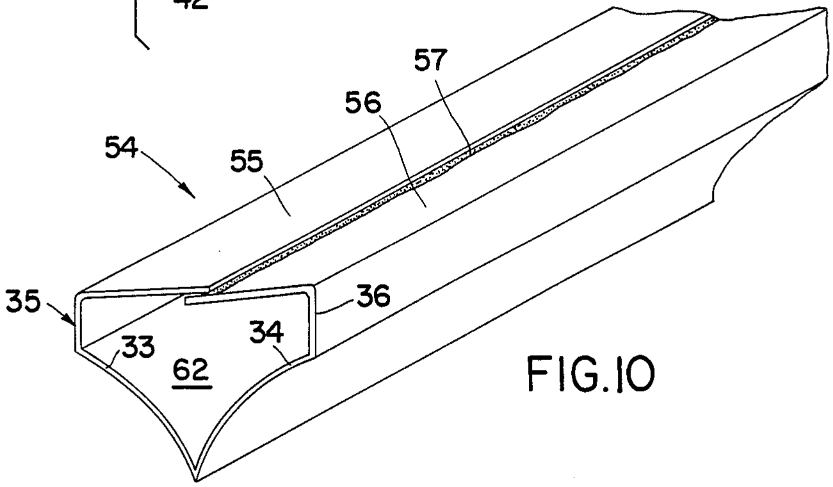
Figure 11:
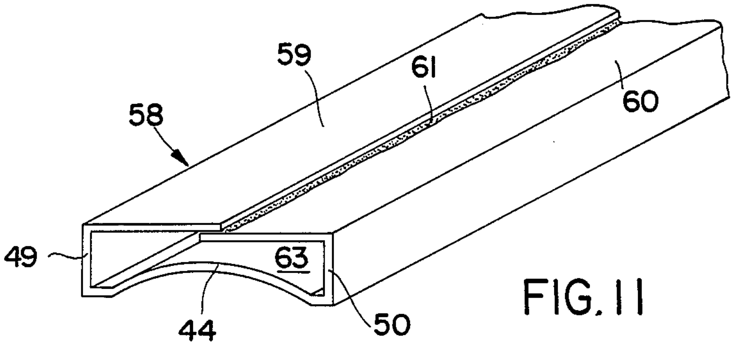
Figure 12:
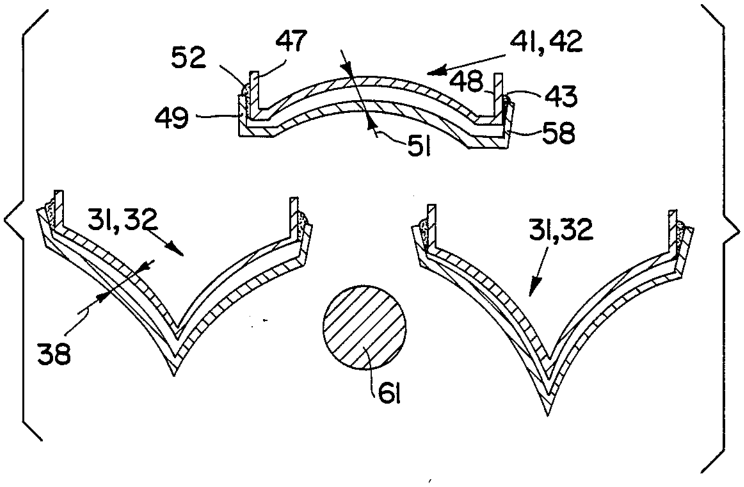
Figure 13:
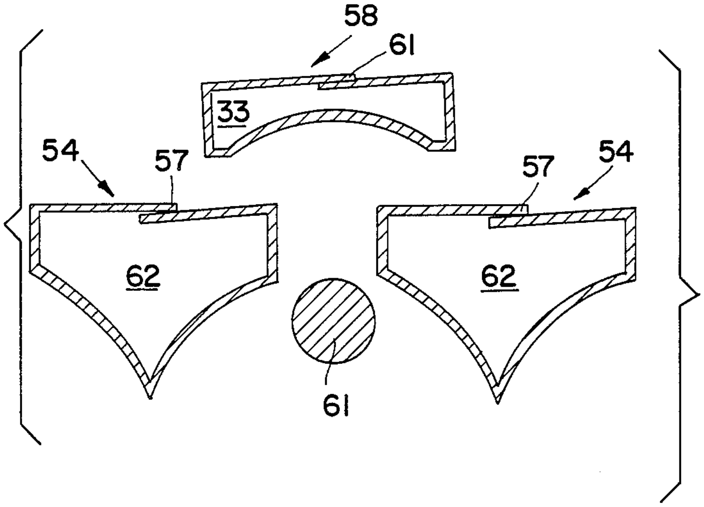
Figures 18, 19:
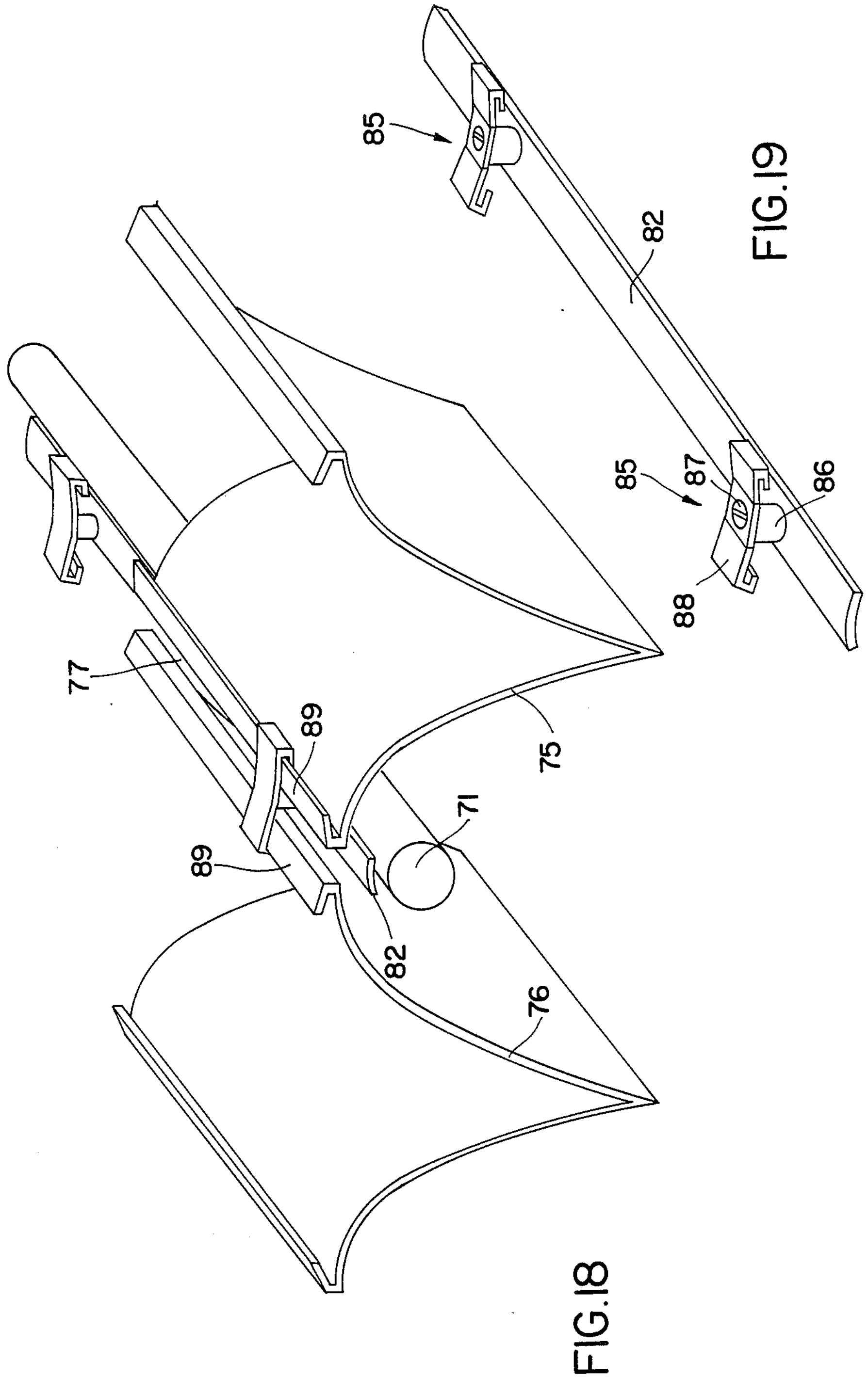

FIGS. 10 and 11 correspond to another alternative form of construction of the V-section element and the rear shield;

FIG. 12 is a transverse sectional view of the reflector which is obtained by means of the alternative embodiment of FIGS. 6 to 9;

FIG. 13 is a similar sectional view of the receiver which is obtained by assembling the members of the alternative embodiment of FIGS. 10 and 11;

FIG. 14 is a sectional view illustrating a known form of construction for positioning the shield;

FIG. 15 is a corresponding view which illustrates the device in accordance with the invention;

FIG. 16 shows an infrared-radiation tube in accordance with the invention;

FIGS. 17 to 19 illustrate two alternative embodiments of a detachable shield in accordance with the invention.

There is shown in the drawings a panel 1 which is employed both for producing infrared-radiation and for diffusing said radiation by reflection over its entire surface.

The panel consists of a frame formed by two cross-members 2 and by two longitudinal members 3 and 4. Emitting tubes 5 of quartz are placed side by side and in parallel relation on the rectangular frame thus formed. Each tube 5 is placed within the frame and parallel to the cross-members 2, one end of each tube 5 being supported by the longitudinal member 4 while the other end is supported by the longitudinal member 3. This latter is also provided with electrical connection means consisting in particular of terminal connectors 6 for supplying current to the quartz tubes 5.

Figure 5:
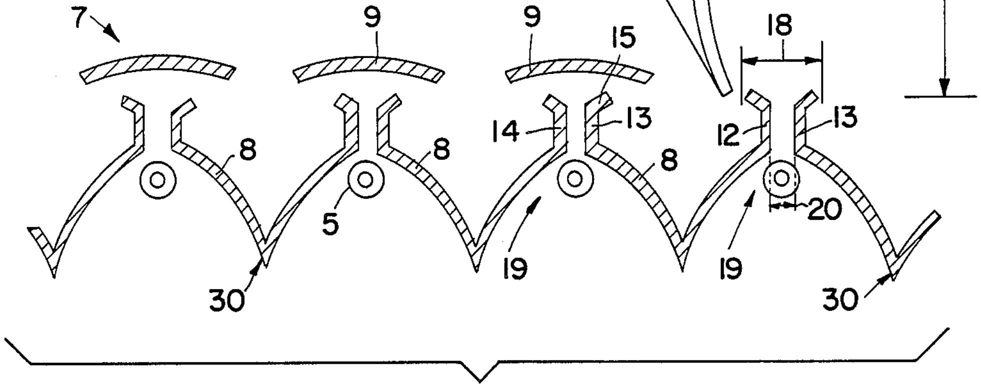
FIG. 5 is a transverse sectional view taken along line V—V (FIG. 1) and showing the arrangement of the reflector as a whole and of the emitting tubes.

The tubes 5 are disposed at intervals on the front face of the panel 1, the rear face of which is occupied by a reflector 7. The entire reflector is formed by the juxtaposed assembly of V-section elements 8 and rear shields 9 (FIG. 5).

Each V-section element 8 is constituted by a sheet metal member bent to a V-shaped cross-section having externally concave lateral faces 10 and 11. Each lateral face 10 or 11 of the V is surmounted by a flange 12 or 13 and this latter is in turn surmounted by a ledge 14 or 15 which is bent inward to a slight extent. There is thus obtained a structure which is shown in detail in FIG. 3 and has the advantage of being self-supporting while at the same time permitting the free development of expansion stresses and deformation even if these latter are variable in time as it is the case if it is desired to vary during operation the power and wavelength of the emitted infrared-radiation.

In order to facilitate the assembly, each flange 21 and 23 is preferably provided with a longitudinal slot 16 for each end of the vertical flanges 12 and 13.

Each shield 9 is constituted by a simple strip of sheet metal which is cambered so as to have an arcuate cross-section, with the result that said strip is also self-supporting. The width 17 of each shield 9 is greater than or equal to the distance 18 between the divergent ends of two ledges 14 and 15 which are juxtaposed after assembly (FIG. 5).

In a best mode of realization (not shown on the drawings) the holder of V-section elements 8 is formed by simple pins which hold the ends of the ledges 14, 15. For the shields 9, three pins are foreseen, one at the center of the concave part, and two at the ends of the convex part.

Figure 1:
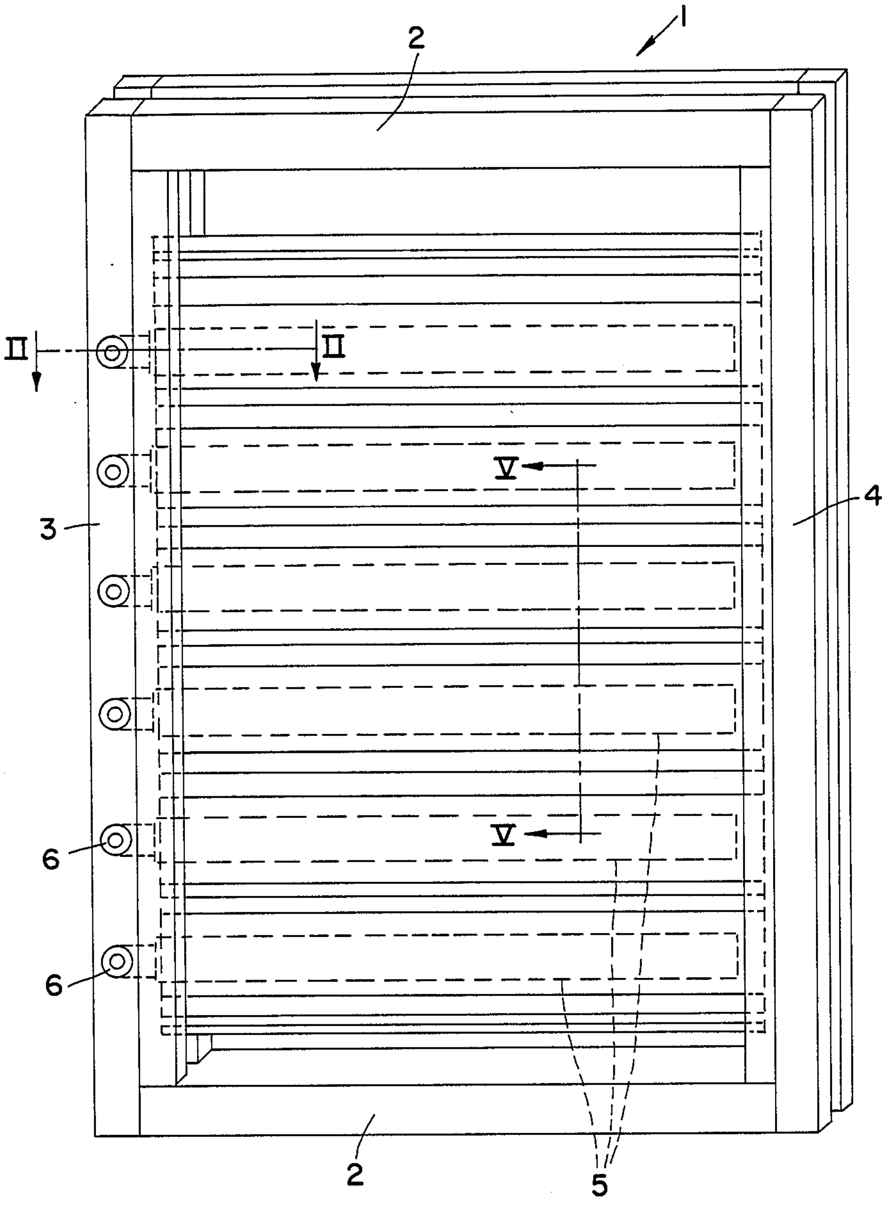
FIG. 1 is a front view of an emitting and reflecting panel in accordance with the invention.
Figure 2:
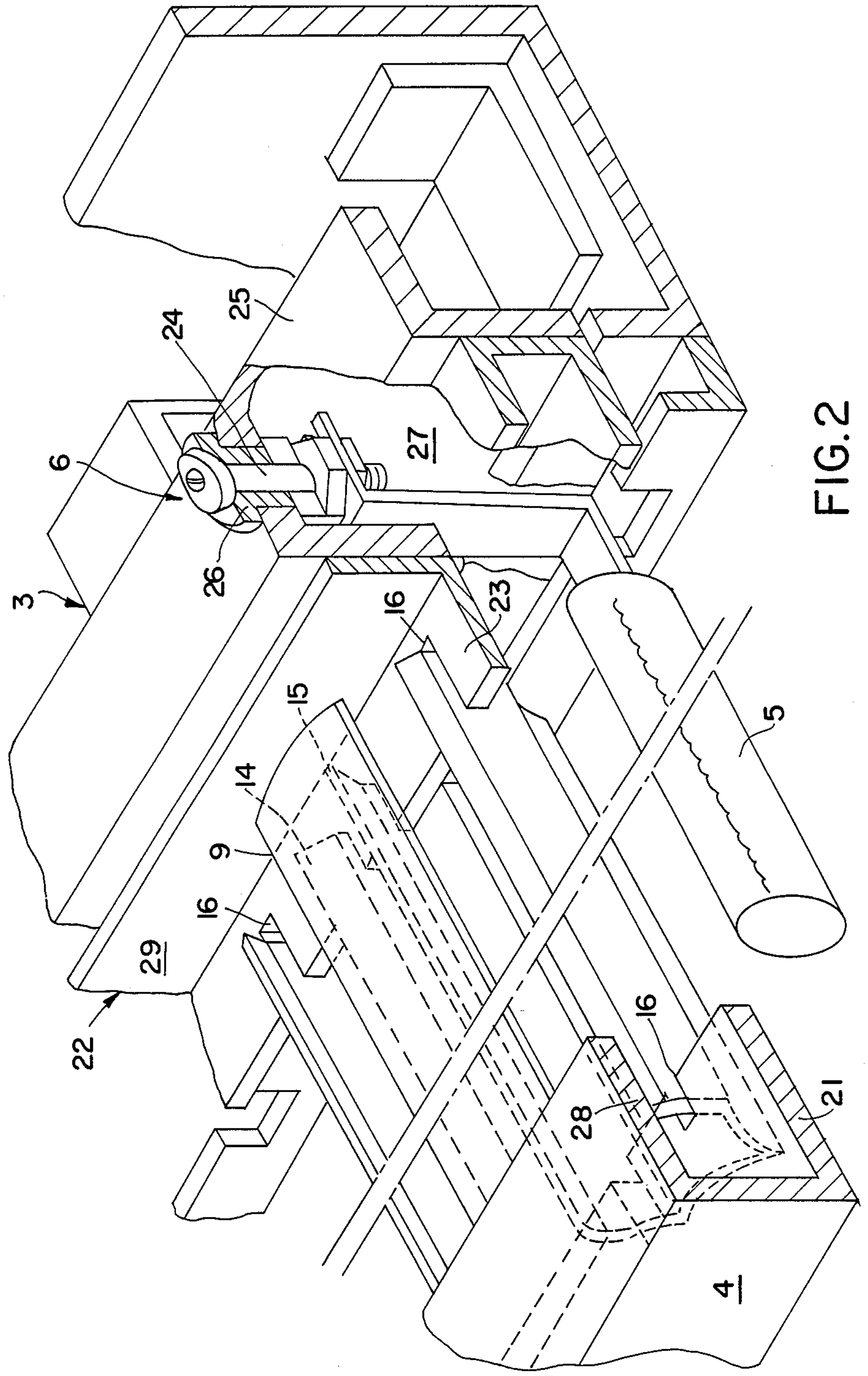
FIG. 2 is a part-sectional view of the panel taken along line II—II (FIG. 1)

The juxtaposed assembly of V-section elements 8 and shields 9 for the purpose of forming the rear reflector of the panel 1 in accordance with the invention takes place as shown in FIG. 5. In other words, the V-section elements 8 are placed longitudinally and side by side, each vertical flange 12 of one element being located in the immediate vicinity of the vertical flange 13 of the adjacent element. There is thus defined around each quartz tube 5 a longitudinal reflecting trough 19, the top of which has a longitudinal connecting gap 20. This gap corresponds to the distance between two adjacent flanges 12 and 13 and its width can vary during operation as a function of progressive variations in power and consequently in temperature. In order to avoid any loss of radiation toward the rear of the reflector, which would in any case correspond to accidental overheating in this zone, the rear side of each gap 20 is closed by covering it with a longitudinal shield 9 which is placed in the manner illustrated in FIGS. 2 and 5. By virtue of the arrangement, it is ensured that the entire radiation emitted by each tube 5 in all directions is reflected toward the front of the panel 1.

For the purpose of assembly, the longitudinal member 4 preferably has a U-shaped cross-section and the bottom flange 21 of said member is adapted to engage in the slots 16 formed in the corresponding end of each V-section element 8. Similarly, each longitudinal member 3 has a U-section member 22, the bottom horizontal flange 23 of which is provided with slots 16 for the corresponding end of each V-section element 8. It is apparent that, after assembly of the frame 2, 3, 4 the ends of the juxtaposed V-section elements 8 are each engaged between the flanges 21 and 23 in such a manner as to ensure that this engagement permits the free development of variable expansion deformations.

Each electrical connection terminal 6 is preferably constituted by a metal connecting stud 24 fitted in a horizontal bearing flange 25 of the longitudinal member 3 with interposition of sleeves 26 of insulating material. The lower metallic end of each stud 24 is connected to a bracket 27 which has the function of supplying current to the quartz tube 5 while at the same time supporting the corresponding end of this latter.

The shields 9 which cover two juxtaposed inwardly bent ledges 14 and 15 (FIGS. 2 and 5) are preferably held in position by engagement beneath the top flange 28 or 29 of the corresponding U-section member 4 or 22.

As will readily be apparent, the transverse profile of each reflecting trough 19 can correspond to any adapted mathematical shape, especially a circular, elliptical or parabolic shape. Better still, two adjacent reflecting troughs can be separated to a greater or lesser extent by increasing the width of the gap 20, thus making it possible to vary the general shape of the reflecting section of the trough 19. By way of example, this can permit the use of two juxtaposed incandescent filaments within one or two quartz tubes 5 placed side by side. In each case, the width 18 of the shield 9 is calculated accordingly in order to provide a total barrier to rearward radiation through the gap 20.

Finally, it is worthy to note that two contiguous troughs 19 are separated from each other only by an arris 30 of zero width. No width is therefore lost between the troughs 19, thus increasing the radiant power of the entire device in respect of the same overall size of the panel 1 and making it possible to fit a greater number of quartz tubes 5 in said panel.

As it has been hereabove explained, it is possible to make better the performances of the device, among others when the infrared-radiations have a high intensity.

Figure 6:
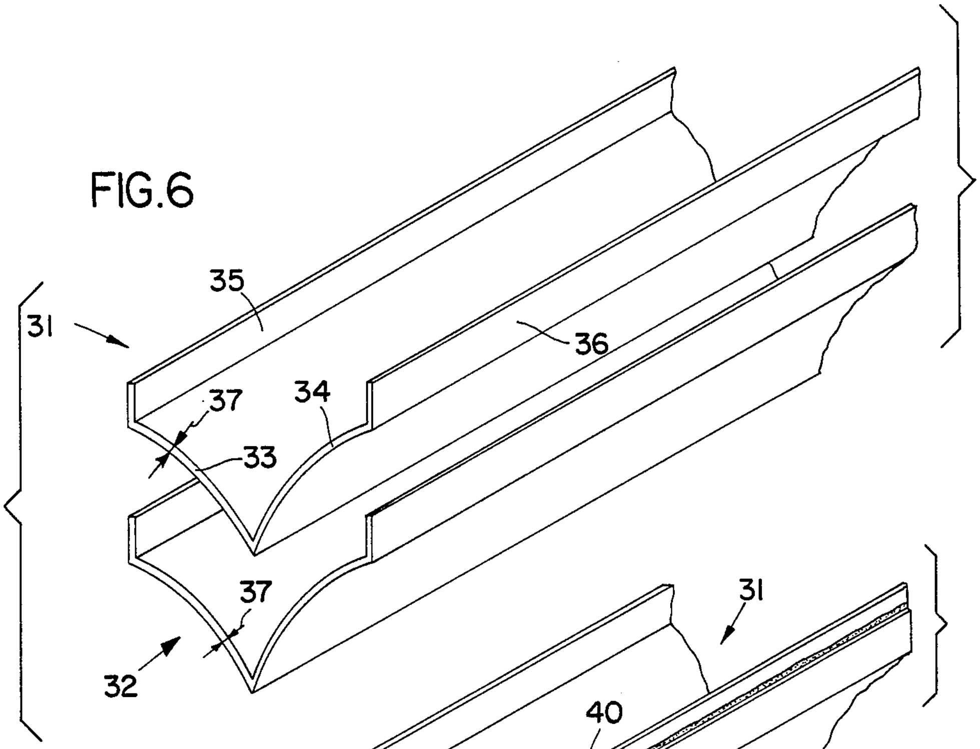
FIG. 6 shows two members prior to assembly for the construction of a double-wall element having a curvilinear V-section.
Figure 7:
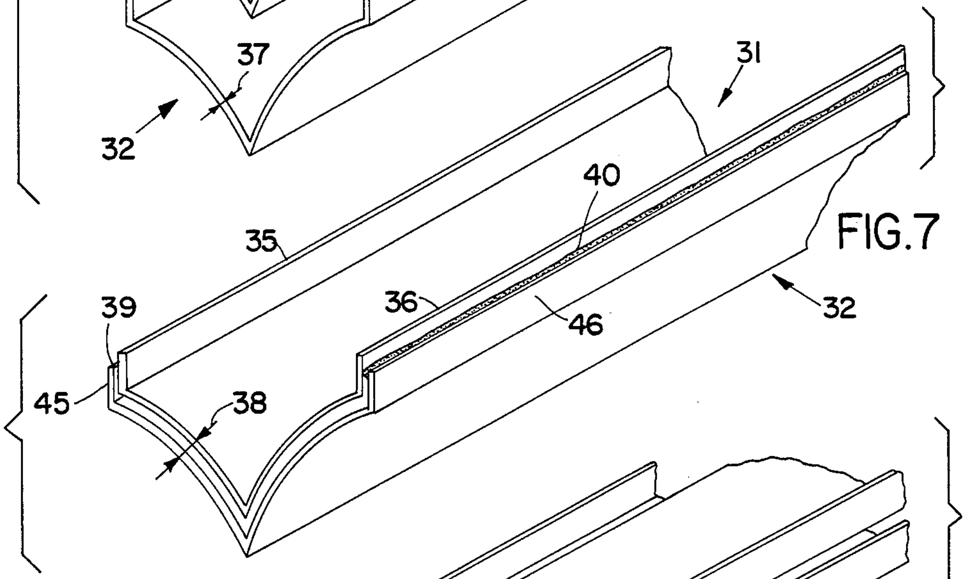
FIG. 7 shows the element which has thus been completed.

There is shown in FIGS. 6, 7 and 12 a reflector element in the form of two half-troughs and constructed by assembling together two elementary members 31 and 32.

The member 31 is formed of sheet metal bent to a V-shaped cross-section having two curvilinear arms 33 and 34 each surmounted by a vertical flange designated respectively by the references 35 and 36.

The member 32 has a cross-section which is identical with that of the member 31 (FIG. 6).

In order to carry out the assembly, the member 31 is tightly fitted within the member 32, thus producing an elastic deformation in order to engage the flanges 35 and 36 of the member 31 between the flanges 45 and 46 of the member 32. The amplitude of this deformation corresponds to the thickness 37 of the sheet metal of each of these members. The engagement of one of the members 31 and 32 within the other is not performed to a complete extent in order to leave between said members a gap 38 corresponding to a double wall which extends over the full length of the curved wings of the V-section.

In order to complete the assembly, there is deposited on each said a weld fillet or bead 39 which joins together the flanges 35 and 45, and a weld fillet 40 for joining together the flanges 36 and 46.

Similarly, the rear shield of the reflector is defined by interengagement of two members 41 and 42 which are identical with each other. The member 41 is of sheet metal bent to a cross-section in the shape of a circular arc 43 which is raised at each end so as to form two flanges 47 and 48.

The member 42 also has a cross-section in the shape of a circular arc 44 located beween two flanges 49 and 50.

Figure 8:
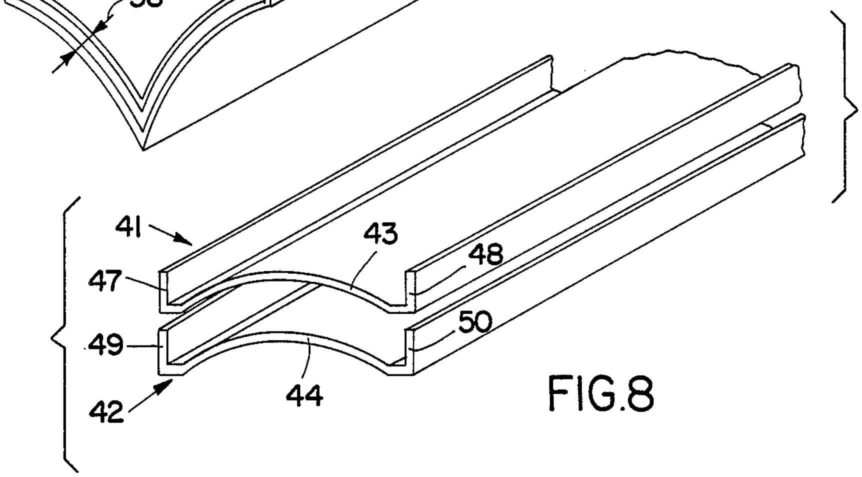
FIGS. 8 and 9 are two similar views for the construction of a rear shield with a double wall.
Figure 9:
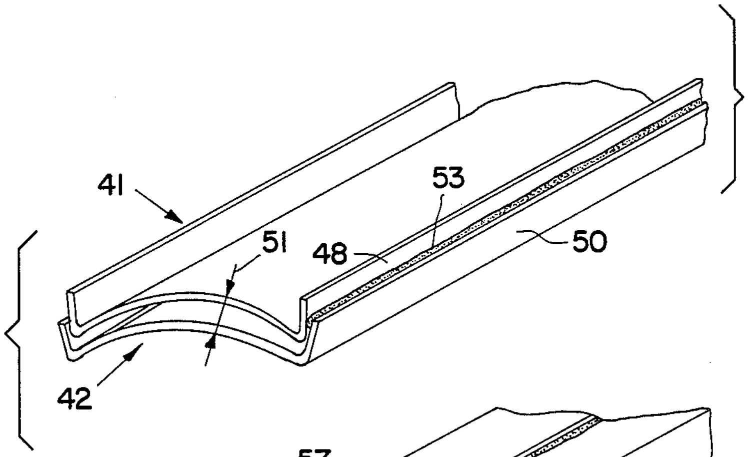

In order to construct th shield 41, 42 of FIG. 8, the member 41 is force-fitted between the flanges 49 and 50 of the member 42. This movement is carried out with an ampliitude of elastic deformation which corresponds to the thickness of the sheet metal. Engagement is not carried out completely in order to leave a free gap 51 between the two circular arcs 43 and 44 (FIG. 12).

In this case also, the assembly operation is performed by placing a weld fillet 52 along the flanges 47 and 49 while a similar weld fillet 53 assembles the flanges 48 and 50.

In the alternative ambodiment illustated in FIGS. 10 to 13, each element in the form of two half-troughs 54 is constructed in a single piece in the form of a strip of bent sheet metal, the cross-section of which defines as in the previous embodiment the two inwardly curved wings 33 and 34 of a V and the two lateral flanges 35 and 36. In this case, however, these two flanges are each surmounted by a longitudinal ledge 35, 36. These two ledges are bent toward each other and overlap in their connection zone in which they are joined together by means of a weld fillet 57. The reflector element 54 is therefore provided in the form of a tube whose transverse cross-section has substantially the shape of a triangle, two sides of which are curvilinear.

Similarly, each shield 58 of said reflector is formed by folding-bank a single strip of sheet metal with a cross-section comprising a circular arc 44 located between two bent-back flanges 49 and 50 having extensions in the form of two longitudinal ledges 59 and 60 which are bent-back toward each other until they overlap in their connection zone. In this zone, a weld fillet 51 completes the assembly.

Figure 3:
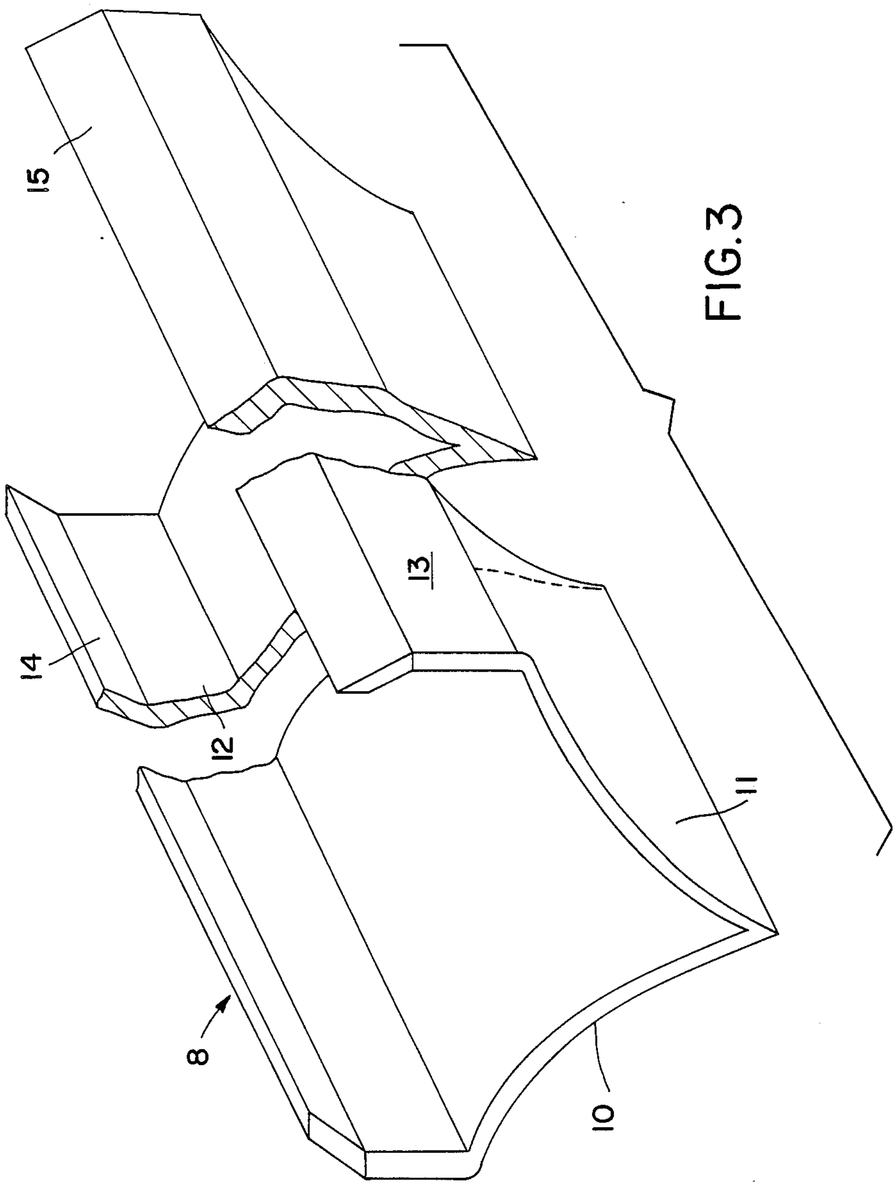
FIG. 3 is a perpective view showing one of the V-section elements, the justaposed assembly of which forms the reflector.
Figure 4:
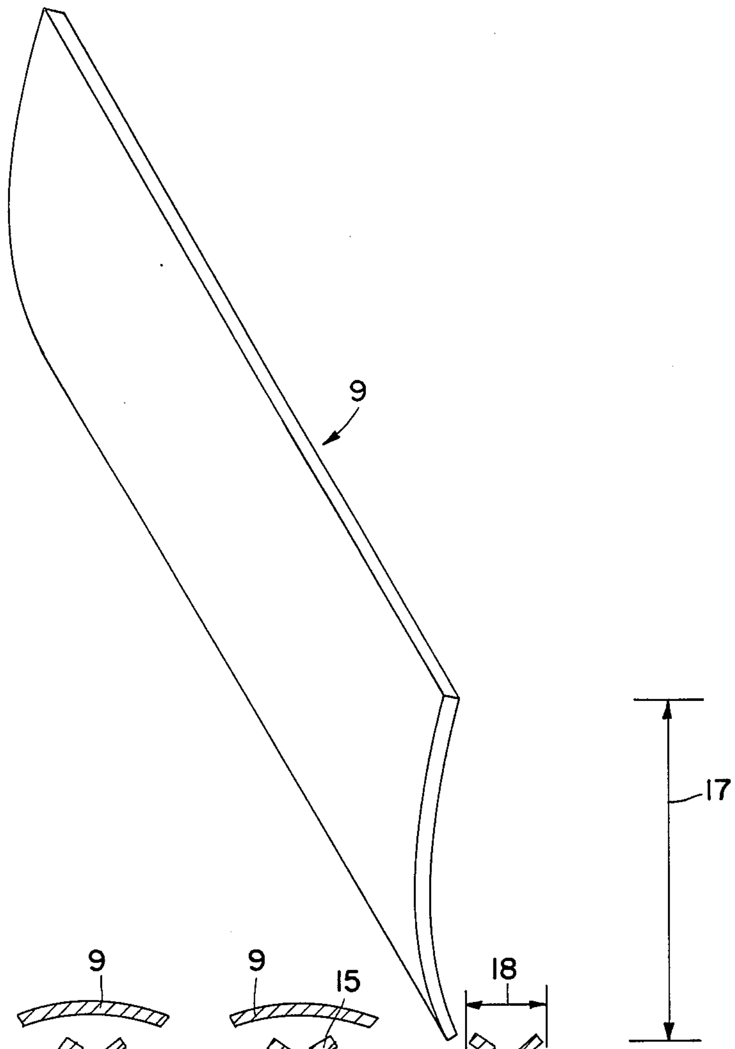
FIG. 4 is a perspective view showing one of the shields which is placed behind the connection gap of the V-section elements of the reflector.

The operation is as follows:

In the heating appliance, one zone of the reflector is located behind each infrared-radiation emitting tube 61 and comprises:

two elements in the form of half-troughs and designated by the references 31, 32 (alternative embodiment of FIG. 12) or by the reference 54 (alternative embodiment of FIG. 13);

a rear shield designated by the reference 41, 42 in FIG. 12 and designated by the reference 58 in FIG. 3.

It is known that these reflector elements are sufficient to protect the rear zone of the appliance (the top of each FIGS. 12 or 13 against any accidental loss or leakage of infrared-radiation in this direction.

In the case of the present invention, since each element 31, 32, 41, 42 or 54, 58 of the reflector is of double wall construction, it has an internal space 38, 51 or 62, 63 in which is circulated a coolant fluid such as, for example, air or even water.

By virtue of this arrangement, the heating power of the tubes 61 can be considerably increased while maintaining the reflector as a whole at a relatively low temperature. Among other things, this protects the rear zone of the reflector against any accidental overheating.

As hereinabove indicated, the presence of a gap between to reflecting devices is liable to produce both a loss of infrared-radiation and overheating of the rear zone of the cassette at the bottom of each trough, that is to say behind each generating tube.

In order to overcome these drawbacks, it is possible to foresee a rear shield as shown on FIGS. 14 to 19.

There is shown in FIG. 14 a portion of a cassette of a known type employed as an infrared-radiation generator.

Said cassette comprises in particular radiation-emitting tubes 71 each located opposite to a reflecting trough 72. The reflector assembly as a whole is constituted by a juxtaposed array of a plurality of reflecting elements 3 each having a cross-section in the shape of a V, the two wings of which are concave. The pointed tip of the V of each element 73 defines a longitudinal arris 74. Thus each trough 72 is defined between two successive arrises 74 formed by two half-troughs 75 and 76 corresponding to two different elements 73. The junction between the two half-troughs 75 and 76 is effected at the bottom of the trough 72 along a longitudinal gap 77.

In order to prevent the radiation emitted by the tube 71 from being lost by diffusion through the gap 77 to the rear zone 78 of the cassette, it is possible to place in position a shield 79 consisting of a shallow trough having high rigidity. It is apparent from FIG. 14 that the positioning of the shields 79 complicates the manufacture of the entire cassette to a considerable extent by reason of the fact that:

in the first place, a well-defined free space 80 must be left between the shield 79 and the gap 77 in order to avoid any interference with the flow of cooling air;

in the second place, this arrangement makes it necessary to provide a shield 79 of relatively substantial width 81 which is much larger than the width of the gap 77.

In accordance with the invention (FIGS. 15 to 17), a shield of this type is no longer provided behind the gap 77. This gap 77 still remains shielded against radiations by means of a shield 82 but the invention lies in the fact that the shield 82 is located in front of the gap 77.

In the embodiment illustrated in FIGS. 15 and 16, the shield 82 is constituted by a narrow strip of metal or ceramic material which is deposited directly on the wall of the emitting tube 83. In other words, each emitting tube 83 in accordance with the invention is accordingly provided with its own shield 82 as shown in the form of a narrow metallic strip disposed longitudinally on the wall of the tube.

In the alternative embodiment illustrated in FIGS. 15 and 17, the metallic strip 82 constituting the shield is designed on the contrary in the form of a detachable strip, that is to say a narrow strip of sheet metal which can be attached to the tube 83 by slightly forcible engagement of resilient snap-action clips 84.

In the alternative embodiment illustrated in FIGS. 18 and 19, the back of the metallic strip 82 constituting the shield is fitted with hook-type fastening-clips 85 each formed by a tubular spacer member 86, a screw 87, and a cross-strip 88 which can be detachably engaged over the flanges 89 (FIG. 18) by hooking, said flanges 89 being formed along the top edge of two half-troughs 75 and 76 on each side of the gap 77. Thus, after assembly (FIG. 18), the shield 82 is fixed between the tube 71 and the gap 77 so as to mask this latter while permitting free circulation of air.

I claim:

1. Device for the production and reflection of infrared radiation in the form of a panel in which a plurality of radiation-emitting tubes are grouped together and reflecting means are located behind said tubes, wherein said device comprises a rectangular frame in which the said radiation-emitting tubes are placed at an equal distance and parallel to each other parallel to a longitudinal direction, said reflecting means comprising a reflector having concave troughs behind said emitting tubes, each of said troughs being formed by a juxtaposed assembly of two symmetrical longitudinal elements having a V-shaped cross-section with two externally concave arms having end portions with flanges, a longitudinal reflecting shield supported by said frame and masking a connecting gap formed by two juxtaposed elements, said longitudinal elements at two opposite ends and said frame comprising cooperating means, said cooperating means including slots for receiving said end portions of said concave arms while said flanges extend laterally out of said slots, said cooperating means retaining said elements and permitting thermal expansion in use.

2. Device in accordance with claim 1, characterized in that each longitudinal element having a biconcave V-section is constituted by a sheet metal member which is bent to said V-section profile so that said element is not only self-supporting but also capable of elastic deformation under the action of variable thermal stresses of the type encountered, for example, if the radiant power and therefore the wavelength of the rays emitted by the quartz tube are varied during operation.

3. Device in accordance with claims 1, characterized in that each V-section element has two externally concave lateral faces, each face being surmounted by a flange which is in turn surmounted by a ledge which is bent inward to a slight extend so that when several elements are juxtaposed, a longitudinal gap is thus defined between each flange of one element and the adjacent flange of the adjacent element.

4. Device according to claim 1, characterized in that each reflector comprises a juxtaposed assembly of rear shields and of elements in the form of two half-troughs, and at least the elements in the form of two half-troughs are hollow, a coolant fluid being circulated within the internal space pf said elements.

5. Device in accordance with claim 1, characterized in that the rear shields are also hollow and have a double wall, a coolant fluid being circulated within the internal space of said shields.

6. Device in accordance with claim 1, characterized in that the coolant fluid which circulates within the double walls of the reflector is blown air.

7. Device in accordance with claim 1, characterized in that each element in the form of two half-troughs is constructed by interengaging two identical members which are formed of sheet metal bent to a cross-section having a V-shape with inwardly curved wings each surmounted by a vertical flange and the assembly operation being performed by means of a weld fillet for joining together the flanges and and by means of weld fillet for joining together the flanges and.

8. Device in accordance with claim 4, characterized in that each rear shield is constructed by interengaging two identical members of sheet metal bent to a cross-section having the shape of a circular arc surmounted by two vertical end flanges, the assembly operation being performed by means of a weld fillet for joining together the flanges and by means of a weld fillet for joining together the flanges.

9. Device in accordance with claim 4, characterized in that each element in the form of two half-troughs is constructed by bending a strip of sheet metal completely closed by a longitudinal weld fillet and having a triangular cross-section, two sides of which are curvilinear and joined together by two rectilinear flanges.

10. Device in accordance with claim 4, characterized in that each rear shield is constructed by bending a strip of sheet metal completely closed by a longitudinal weld fillet and having a cross-section in the shape of a circular arc joined by means of two vertical flanges to the flat top wall.

11. Device in accordance with claim 1, characterized in that at least the reflecting surface of each V-section element of the reflector is constituted by a layer or a sheet of gold or of another reflecting metal.

12. Device in accordance with claim 1, for providing a barrier to the radiation emitted by a tube in the direction of a gap defined in the reflector with is located being said tube, characterized in that the shield is constituted by an opaque strip applied along part of the rear surface of the radiant tube which is either of metal or ceramic material.

13. Device in accordance with claim 12, characterized in that the opaque strip forming the shield is constituted by a metallization deposit formed directly on the wall of the tube, provision being accordingly made for an ordinary tube which is metallized only along a reflectorized strip.

14. Device in accordance with claim 12, characterized in that the shield is constituted by a concave sheet-metal strip mounted against a portion of the rear longitudinal wall of the tube.

15. Device in accordance with claim 12, characterized in that the width of the metallic strip in the form of a trough is distinctly smaller that the diameter of the tube.

16. Device in accordance with claim 12, characterized in that the concave metal trough constituting the shield is fixed on the tube by snap-action engagement of a resilient fastening-clip, with the result that when a tube is changed, the shield of the old tube can be used on the new tube.

17. Device in accordance with claim 12, characterized in that detachable fastening of the metallic strip is effected by means of resilient clips.

18. Infrared-radiation tube for equipping a device in accordance with claim 12, characterized in that provision is made along the lenght of said tube for an opaque strip of metal or ceramic material having a width which is smaller than the diameter of said tube.

19. Device in accordance with claim 12, characterized in that the shield is constituted by a concave opaque strip of sheet metal fitted with hook-type fastening clips which can be engaged by hooking over flanges formed at the top edges of the two half-troughs, and the shield being accordingly maintained at a distance between the emitting tube and the gap which is masked by the shield without interrupting the circulation of air.

20. Device in accordance with claim 19, characterized in that each hook-type fastening clip is provided with a tubular spacer member a connecting-screw and a resilient fastening strip.

21. Device in accordance with claim 19, characterized in that the panel is constituted by a frame formed by two cross-members and by two longitudinal members and the emitting tubes being placed side by side in parallel relation to the cross-members.

22. Device in accordance with claim 19, characterized in that a longitudinal slot is provided in each vertical flange at each end of a V-section section element.

23. Device in accordance with claim 19, characterized in that each shield is constituted by a simple strip of sheet metal which is cambered so as to have a concave cross-section and is consequently also self-supporting after said strip has been placed in a position in which it covers the rear portion of the corresponding longitudinal gap.

24. Device in accordance with claim 19, characterized in that the juxtaposed assembly of V-section elements defines around each quartz tube a longitudinal reflecting the top of which forms a longitudinal connection gap whose width is capable of varying during operation.

25. Device in accordance with claim 19, characterized in that a horizontal flange is provided along the longitudinal member while an opposite longitudinal flange is provided along the longitudinal member, the slots of one end of each V-section element being engaged over the flange of the longitudinal member whereas the slots formed at the opposite end of said element are engaged over the flange of the longitudinal member.

26. Device in accordance with claim 19, characterized in that two contiguous troughs of the panel are separated only by a longitudinal arris having a practically zero width.

* * * * *

UNITED STATES PATENT AND TRADEMARK OFFICE

CERTIFICATE OF CORRECTION

PATENT NO. : 4,596,935

DATED : June 24, 1986

INVENTOR(S) : Christian Lumpp

It is certified that error appears in the above-identified patent and that said Letters Patent is hereby corrected as shown below:

Column 2, line 66 for ""metal"" read -- "sheet metal" --.

Column 5, line 66 for "said" read -- side --.

Column 6, line 13 for "ampliitude" read -- amplitude --.

Column 8, line 47 for "pf" read -- of --.

Column 6, line 10 for "th" read -- the --.

Column 9, line 41 for "that" read -- than --.

Column 10, line 3 for "lenght" read -- length --.

Signed and Sealed this

Twenty-sixth Day of November, 1991

*Attest:*

HARRY F. MANBECK, JR.

*Attesting Officer* *Commissioner of Patents and Trademarks*